Sept. 29, 1964   B. A. GAY ET AL   3,150,591
ZERO-GRAVITY RELEASE MECHANISM
Filed Dec. 11, 1961

INVENTORS.
B. A. GAY, L. R. JOHNSON,
E. C. SULZE, J. H. CARTER
BY
W. O. Quesenberry
O. E. Hodges
ATTYS.

United States Patent Office

3,150,591
Patented Sept. 29, 1964

3,150,591
ZERO-GRAVITY RELEASE MECHANISM
Benjamin A. Gay, Lehighton, Pa., and Lee R. Johnson, Kirkwood, Eugene C. Sulze, Lemay, and John H. Carter, Webster Groves, Mo.; said Gay, said Sulze and said Carter assignors, by mesne assignments, to the United States of America as represented by the Secretary of the Navy
Filed Dec. 11, 1961, Ser. No. 176,466
9 Claims. (Cl. 102—84)
(Filed under Rule 47(b) and 35 U. S. C. 118)

The present invention relates to a detector of free fall or zero gravity and more particularly to a safety or arming device for rockets or other projectiles, especially those which are subject to spin and yaw in flight, such as the conventional aerial drop bomb.

In the field of detecting the free fall of an object for use in arming devices and fuses, it has been the general practice to employ a mass supported in some manner to sense the time at which force is no longer exerted by the mass on its support, however, these devices have not always proved satisfactory in that such devices have proved unreliable when affected by yaw and spin of the object.

The general purpose of this invention is to provide a gravity sensing device which embraces the advantages of prior free-fall sensing devices and possesses none of the afore described disadvantages. To attain this object, the present invention contemplates a unique arrangement of a ring-shaped or toroidal mass and sensing supports therefor whereby unreliability and inoperativeness of the sensing device during yaw and spin of the object are avoided.

An object of the present invention is the provision of a new and improved free-fall sensing device for use in arming and fuzing mechanism for bombs, rockets, and the like.

Another object is to provide a new and improved arming and fuzing mechanism which is actuated by the free fall of an object.

A further object of the invention is to provide an arrangement for sensing the lack of gravitational force on an object and which remains sensitive regardless of the yaw and spin of the object containing the sensing device.

Still another object is to provide an improved shape of the mass used for sensing free fall such that the mass may more easily be aligned with the axis of spin or yaw of the falling object.

Still another object of the present invention is the provision of a more sensitive arming and fuzing device which is actuated by the free fall of the bomb with no sacrifice of safety in operation of the same.

Other objects, and many of the attendant advantages of this invention, will be readily appreciated as the same becomes better understood by reference to the following detailed description when considered in connection with the accompanying drawings in which like reference numerals designate like parts throughout the figures thereof and wherein.

Figure 1:
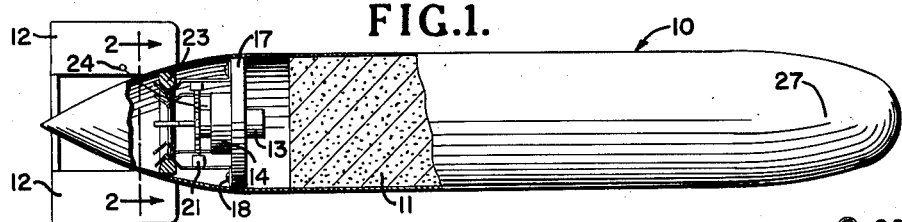
FIG. 1, is a view of a center section of a conventional aerial bomb with the free-fall arming mechanism of the present invention installed therein.

Referring now to the drawing, wherein like reference characters designate like or corresponding parts throughout the several views, there is shown in FIG. 1 a preferred embodiment mounted in a conventional aerial bomb 10 containing an explosive 11 to which are attached the usual fins or stabilizers 12. The other portion of the bomb 10 contains the actuating mechanism composed of a fuze or arming circuit 13, a spring motor actuated gear train 14 to which the detent gear 15 is attached through shaft 16, as is more clearly shown in FIGS. 3 and 4.

The spring motor and gear train 14 and the fuze 13 are attached to a base plate 17 which is in turn attached to the body of the bomb 10. The spring motor and gear train operate as a mechanical clock to delay actuation of the fuze and arming mechanism 13 for a predetermined time, usually for seconds, after the release of the detent gear 15.

Figure 4:
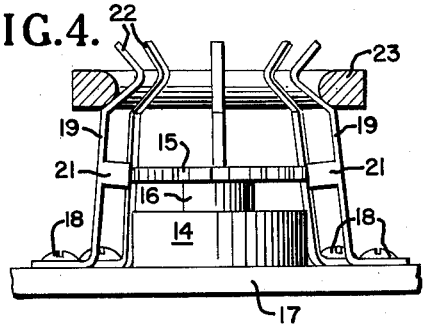
FIG. 4, is an enlarged fragmentary sectional view of the mass in its supported position.

Also attached to the base plate by the screws 18, are leaf spring lever arm supports 19 each having thereon a protrusion 21 which can mesh with the teeth of the detent gear 15, as shown in FIG. 4. The spring lever arm 19 is made of a resilient materal, suitable for the purpose such as steel or other well known spring material. The protrusion 21 may be an integral part of the spring lever arm or, if desired, it may be a piece of other rigid material firmly attached thereto. Supported in the recessed V-section 22 of the spring lever arm 19 is a ring-shaped mass 23. The mass 23 may be of any material of density great enough to give proper deflection to the spring lever arms 19 when supported thereby.

Also shown is a pull wire 24 threading a hole 25 in the detent gear 15. The pull wire is of such rigidity as to restrain the movement of detent gear 15 when inserted in hole 25. The pull wire is removed by pulling from the bomb by the handle 26 on the outside of the bomb before or at the time of release of the bomb from the plane.

Figure 2:
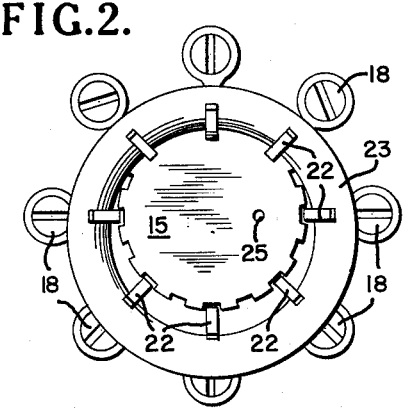
FIG. 2, is an enlarged view of the sensing element taken along the line 2—2 of FIG. 1.
Figure 3:
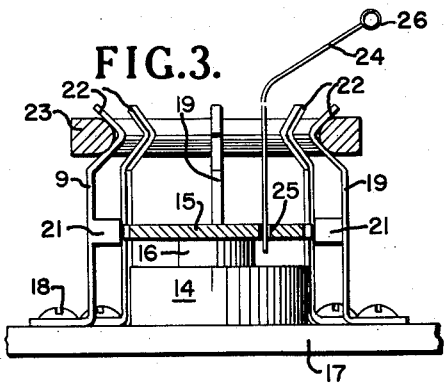
FIG. 3, is a view showing an enlarged sectional view of the free-fall sensing device of FIG. 1 in its free-fall position.

The operation of the device is as follows. Referring to FIGS. 2 and 3, the mass 23 is shown within the V-shaped portions of eight leaf spring lever arm supports 19 equally spaced about the inside diameter of the ring shaped mass 23. When the mass 23 is supported by at least one of the V-shaped sections 22 (FIG. 4), the supporting leaf spring lever arms are deflected by the force of the mass such that the protrusion 21 on each of those arms is forced into contact with the detent gear 15 and between the teeth thereof such as to prevent the rotation of the detent gear by the force of the spring motor acting through the gear train and shaft 16.

The pull wire 24 is an additional safety device which prevents rotation of the detent gear 15 when in hole 25. The pull wire 24 is removed before release of the bomb by the plane.

When the bomb 10 is released from the plane and begins its free fall, the mass 23 becomes substantially weightless in relation to the structure of the bomb. The mass 23 is no longer supported by the spring lever arms 19 as heretofore. The force exerted by the spring action of the arms is sufficient to move the mass 23 from the position shown in FIG. 4 to the position shown in FIG. 3; whereby the protrusions 21 are not in contact with the teeth of the detent gear 15, thus allowing movement of the gear train 14 by the force of its spring motor resulting in the setting of the fuze or arming device 13 after a predetermined delay.

As shown by FIG. 1, the mass 23 is supported by the spring lever arm supports 19 such that its center of gravity is substantially aligned with the axis 27 of the bomb.

This alignment with the axis of the bomb minimizes the effect of spin on the mass. If the center of the mass were displaced from the axis of the spin, such spin movement during free fall of the bomb might cause the mass to be forced against the supports 19 by centrifugal force, sufficiently to prevent release of the detent gear. The ring configuration of the mass minimizes the effect of centrifugal force on the mass due to the spin of the bomb or object. The ring configuration of the mass 23 allows the mass to be more easily aligned with the axis 27 of the bomb by bore sighting methods than would be possible with a solid mass. Further, the ring configuration distributes the mass at a considerable distance about the axis 27. A more concentrated configuration of the mass would result in placing a greater proportion of the mass on one side of the axis of spin for a slight displacement from that axis, thus intensifying the effect of centrifugal force caused by spin. This consideration is important in view of the fact that the mass must be movably supported by the supports 19; therefore, although initial alignment of the mass 23 and its supports with the axis is important to establish the position of the mass in all conditions at a minimum distance from the axis of spin, the center of the mass 23 will be out of alignment with the axis during certain normal conditions of operation, such as, the holding of the bomb 10 in the horizontal altitude as shown in FIG. 1.

The adverse effects of yaw of the bomb or other object, are obviated by the multidirectional characteristic of the mass and support configurations. It can be seen that the illustrated device provides this multidirectional sensing of a substantially zero gravity condition even though FIG. 4 illustrates the condition in which the sensing arrangement is held upright with the mass 23 horizontal. In the case where the axis 27 of the bomb is horizontal, the mass is supported by one or more of the springs 19, thus bringing at least one protrusion 21 into contact with the detent wheel 15.

It is also obvious that although on FIGS. 1, 2, and 3 are shown eight support springs, the object of the invention may be accomplished by any number of support springs greater than one which adequately support the mass.

Figure 5:
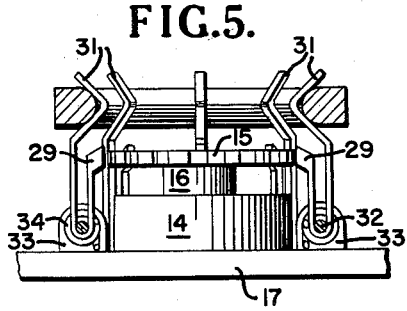
FIG. 5, illustrates a more compact modification of the device of FIG. 3.

In FIG. 5 is shown another embodiment of the invention which provides a more compact support spring, lever arm arrangement, thus allowing the entire element to be less space consuming within a projectile. The support member 31 is movably pivoted about the center 32 on a raised portion 33 of the basic plate 17. A torsion spring 34 urges the support member 31 into contact with the mass 23. In this embodiment, the support member 31 is preferably composed of a rigid material rather than the leaf spring material used in the support member 19 of the embodiment of FIG. 3. The operation of the device of FIG. 5 is substantially the same as that explained in connection with FIGS. 1, 2 and 3. When the mass 23 is supported by the V-shaped section of the support member 31, the opposite end 29 thereof, is forced between the teeth of the detent gear 15 to prevent its rotation. During free fall, the mass is no longer supported by 31 as heretofore, and the spring 34 moves the stop end 29 out of engagement with detent gear 15.

Figure 6:
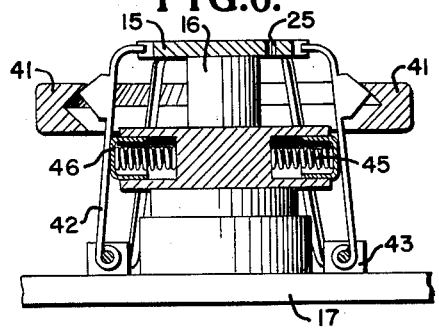
FIG. 6, is a view showing another modification of the device in section.

FIG. 6 illustrates still another embodiment which shows the mass 41 having a concave V-shaped cross section on its inside diameter and a convex V-shaped section on the support member 42. One end of the support element is rotatably hinged on a pivot point, attached to a raised portion 43 of the base plate 19, and the other end is selectively inserted into the teeth of the detent gear 15. A spring 45 and a piston 46 form a spring loaded capsule which urges the support element 42 into contact with the mass 41. The operation is similar to the embodiments in FIGS. 3 and 5 in that during the condition of free fall, the support member 42 is urged out of contact with the dent wheel 15, thus allowing its free rotation. The support members 42 may have their V-shaped sections made of nylon or other material. This embodiment provides more support area between the support member and the mass, such as to minimize the effects of cutting or scoring of one element by the surface of the other.

It should be noted that suitable stops may be provided above and below the mass and on all sides to limit the absolute movement thereof, in order to maintain the position of the mass in operable relationship with the supports even after severe acceleration forces such as are caused by rough handling or by initial acceleration as in the firing of rockets or other projectiles. The stops are not shown in the drawing, but the provision of such stops would be obvious to any person skilled in the art. The use of this device in rockets or other force propelled projectiles would result in actuation of the arming device at the time of cutoff of the rocket motors or at the time of emergence of the projectile from the barrel of the gun.

Further, the use of the detent gear and spring motor provides a further degree of safety in that arming of the mechanism only takes place after a prolonged period in which the detent gear is free to rotate. Therefore, an accidental movement or number of movements which might cause the mass to rise free of the supports momentarily will not result in arming of the device.

The invention herein described provides an improved device for sensing a zero gravity or free fall condition which provides increased reliability of operation regardless of spin or yaw of the device and the object in which it is placed. The increased reliability allows the use of a fuzing and arming mechanism actuated under control of a device responsive to free fall of the object to be fuzed or armed and in other applications where such a condition will obtain.

It should be understood, of course, that the foregoing disclosure relates to only preferred embodiments of the invention and that numerous modifications or alterations may be made therein without departing from the spirit and the scope of the invention as set forth in the appended claims.

Obviously many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A device for detecting the free fall of an aerial bomb comprising a base, a control actuating means secured to said base, a plurality of lever arms having one end of each arm mounted on said base and arranged in a circular configuration, means carried by each lever arm for locking said control actuating means when in engagement therewith, said lever arms being normally biased away from said control actuating means to a position wherein said locking means are disengaged, and a toroidally shaped mass resting upon and supported by the free ends of at least some of said lever arms and deflecting these lever arms toward said control actuating means to engage said locking means, the bias force of said deflected lever arms being sufficient under conditions of free fall of the aerial bomb to overcome the inertia of the weightless toroidal mass and shift said mass while assuming their undeflected positions whereby said control actuating means is unlocked.

2. The device of claim 1 in which the lever arms are placed at equal angles from each other on the inside periphery of said mass.

3. The device of claim 2 in which each of said lever arms comprises a recessed section in which said mass is supported.

4. The device of claim 2 in which each of said lever arms comprises a convex section and the face of the ring-shaped mass adjacent thereto comprises a concave surface.

5. The device of claim 1 in which said control actuating means is a spring operated circular gear concentric with the axis of the toroidally-shaped mass.

6. The device of claim 5 in which the lever arms are spring biased into contact with said toroidally-shaped mass and out of contact with said actuating gear.

7. The device of claim 6 in which each of said lever arms is a leaf spring.

8. The device of claim 6 in which each of said lever arms is a spring loaded folded lever arm.

9. The device of claim 6 in which each of said lever arms is an elongated, freely pivoted member which is capsule spring loaded.

References Cited in the file of this patent
UNITED STATES PATENTS

| | | |
|---|---|---|
| 2,357,822 | Hasbrook | Sept. 12, 1944 |
| 2,953,924 | Mathiesen et al. | Sept. 27, 1960 |
| 2,978,906 | Haalek | Apr. 11, 1961 |